United States Patent

[11] 3,579,198

[72] Inventor John A. Giunta
Long Branch, N.J.
[21] Appl. No. 811,440
[22] Filed Mar. 28, 1969
[45] Patented May 18, 1971
[73] Assignee Bell Telephone Laboratories, Incorporated
Murray Hill, Berkeley Heights, N.J.

[54] MICROPROGRAMMED WIRED LOGIC MEMORY
11 Claims, 6 Drawing Figs.

[52] U.S. Cl. .......... 340/172.5
[51] Int. Cl. .......... G06f 9/14
[50] Field of Search .......... 340/172.5, 173, 174, 166; 235/157; 335/112, 152; 179/18

[56] References Cited

UNITED STATES PATENTS

| | | | |
|---|---|---|---|
| 2,479,678 | 8/1949 | Graybill et al. .......... | 335/112 |
| 2,794,073 | 5/1957 | Hoppe .......... | 179/18 |
| 3,348,206 | 10/1967 | Dannatt .......... | 340/172.5 |
| 3,404,378 | 10/1968 | Threadgold et al. .......... | 340/172.5 |

*Primary Examiner*—Raulfe B. Zache
*Attorneys*—R. J. Guenther and James Warren Falk

ABSTRACT: A microprogrammed logic system containing a crossbar switch read-only-store is arranged to control small electromechanical switching networks. The crossbar switch has a discrete voltage potential on each crosspoint representing, in binary format, either a "O" or a "1". Each horizontal row of the switch corresponds to the memory address of one instruction and upon selection enables the operating of a group of hold magnets thereby closing a predetermined number of crosspoints. Upon crosspoint closure, an instruction, containing as many binary bits as there are closed crosspoints, is available for use by the microprogrammed logic system.

PATENTED MAY 18 1971 3,579,198

INVENTOR
J. A. GIUNTA
BY David Hannenbaum
ATTORNEY

601

| VERT. GROUP 1 SEL. | PROCESSOR OPERATION (REGISTERS A-D) | NEXT ADDRESS (REGISTER E) |
|---|---|---|
| 1 | OPERATE (ONE) RELAY & CK AUX. CCT. | 100011 |
| 2 | OPERATE (TWO) RELAY & CK AUX. CCT. | 100011 |
| 3 | OPERATE (BUSY) RELAY | 000000 |
| 4 | | |
| 5 | | |
| 6 | | |
| 7 | | |
| 8 | | |
| 9 | | |
| 10 | OPERATE (INC) RELAY & CK BUSY IND. OF TRUNKS | 000011 |
| VERT. GROUP 2 SEL. | | |
| 1 | OPERATE (AUX) RELAY | 100100 |
| 2 | OPERATE (STOP) RELAY | 000000 |
| 3 | | |
| 4 | | |
| 5 | | |
| 6 | | |
| 7 | | |
| 8 | | |
| 9 | | |
| 10 | | |

MICROPROGRAMMED WIRED LOGIC MEMORY

BACKGROUND OF THE INVENTION

This invention relates to data processing systems and more particularly to memory equipment for use therein.

DESCRIPTION OF THE PRIOR ART

Electronic processing techniques which combine high-speed operation and programmable flexibility are becoming increasingly more important in the design of telephone switching systems. Of particular importance in this regard are the processors which are controlled by a series of words obtained from a memory in sequential fashion. Each word is termed a microinstruction and consists of two parts: the control bits which enable specific elements of the system under control, and the address bits of the next word to be executed. This type of processor arrangement is termed a microprogrammed logic system and is controlled by a read-only-store (ROS) which store is essentially a memory containing the microinstructions.

In the existing microprogrammed logic arrangements, the microinstruction stores consist of sophisticated electronic memories, usually of the magnetic core type, requiring extensive logic and control circuitry for access purposes. In situations where it is desired to utilize the microprogramming techniques to control small low usage electromechanical switching systems, the amount of logic and control circuitry necessary to access an electronic memory and to protect the memory from environmental problems is out of proportion to the amount of actual memory necessary to control the switching system. Therefore, while the utilization of electronic memory devices is advantageous from the standpoint of flexibility and operational speed, such devices are uneconomical when used to control small low-demand switching systems.

Accordingly, a need exists in the art for a memory device capable of controlling small electromechanical systems which device is easily accessible and unaffected by electronically noisy environments.

SUMMARY OF THE INVENTION

In one embodiment of my invention, a crossbar switch is arranged with a discrete voltage potential on each crosspoint representing in binary format either a "0" or a "1." Each horizontal row of the switch corresponds to the memory address of one instruction and upon selection enables the operation of a group of hold magnets thereby closing a predetermined number of crosspoints. Upon crosspoint closure, an instruction, containing as many binary bits as there are closed crosspoints, is available for use by the microprogrammed logic system. The instruction word contains both switching network control information and the address location of the next instruction to be executed. The structure of the address portion of the instruction word includes fixed higher order bits and lower order bits which may be varied depending on the state of external condition indicators.

In accordance with one feature of the invention, program information is provided economically to a microprogrammed data processing system without the use of complex accessing and memory protection circuitry.

In accordance with another feature of the invention, a group of hold magnets of a crossbar switch is arranged to operate upon the enabling of one select magnet of the switch so as to provide a wired logic microinstruction containing a fixed number of information bits for controlling a data processor system.

In accordance with still another feature of the invention a microprogrammed data processing system controlled by a wired logic crossbar switch memory device is arranged with structured address words containing information bits which may be varied in accordance with information contained in external condition indicators.

DESCRIPTION OF THE DRAWING

The foregoing objects, features and advantages, as well as others of the invention, will be more apparent from the following description of the drawing, in which.

It will be noted that FIGS. 2 through 6 employ a type of notation referred to as "detached contact" in which an "X" shown intersecting a conductor represents a normally open contact of a relay, and a bar shown intersecting a conductor at right angles represents a normally closed contact of a relay; "-normally" referring to the unoperated condition of the relay. The principles of this type of notation are described in an article entitled "An Improved Detached Contact Type Schematic Circuit Drawing" by F. T. Meyer in the Sept. 1955 publication of the American Institute of the Electrical Engineers Transactions, Communications and Electronics, Vol. 74, pages 505—513.

Figure 2:
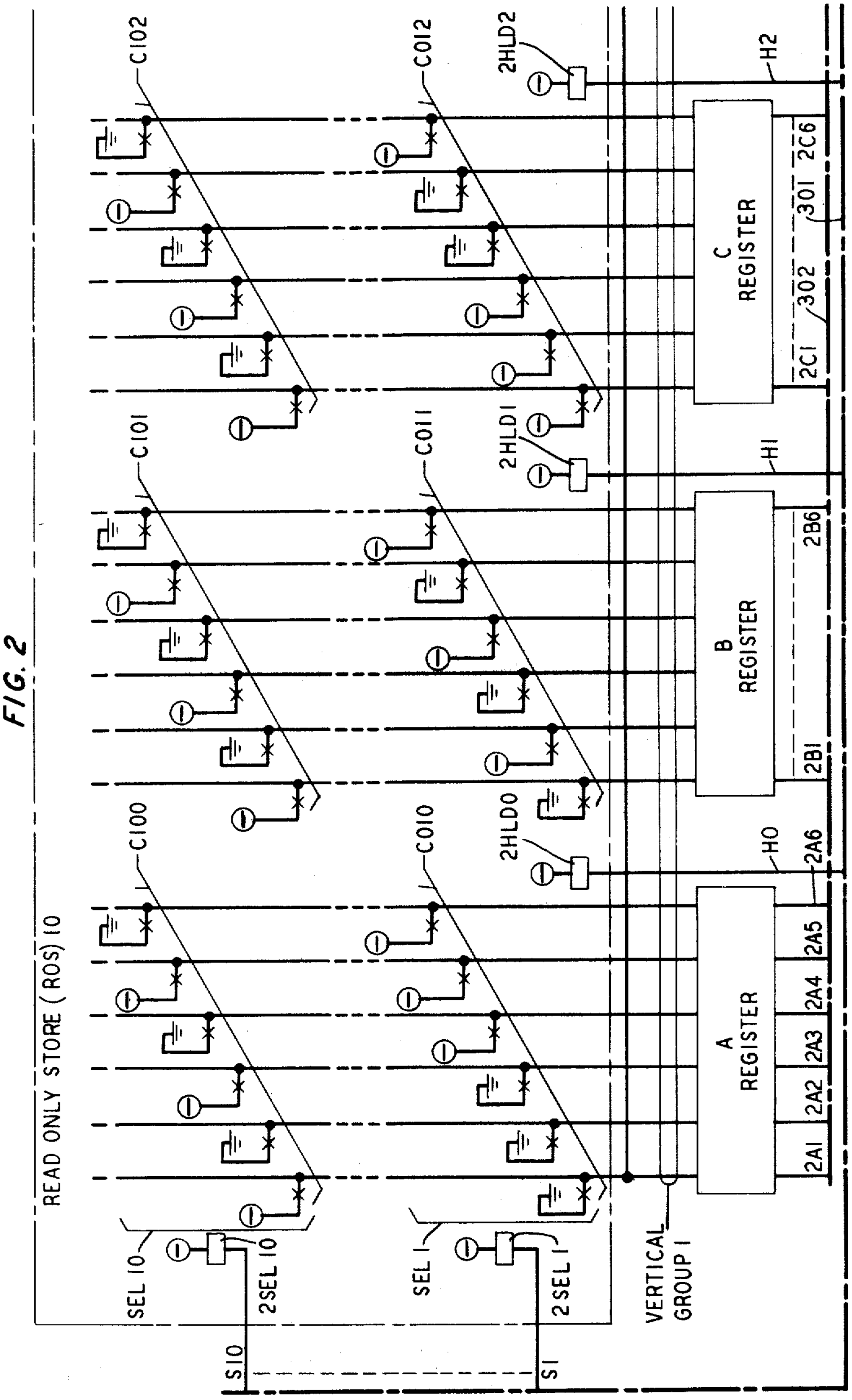
FIGS. 2 through 4 are schematic drawings showing in greater detail the interrelation of the components of the exemplary embodiment.

It will be noted also that in order to simplify the disclosure and thus facilitate a more complete understanding of the embodiment, the relays, relay contacts and other electromechanical devices shown in FIGS. 2 through 6 have been given systematic designations. Thus, the number preceding the letters of each device correspond to the FIG. in which the control circuit of the device is shown. Thus, the coil of crossbar switch magnet 2HLDO is shown in FIG. 2.

GENERAL DESCRIPTION

Figure 1:
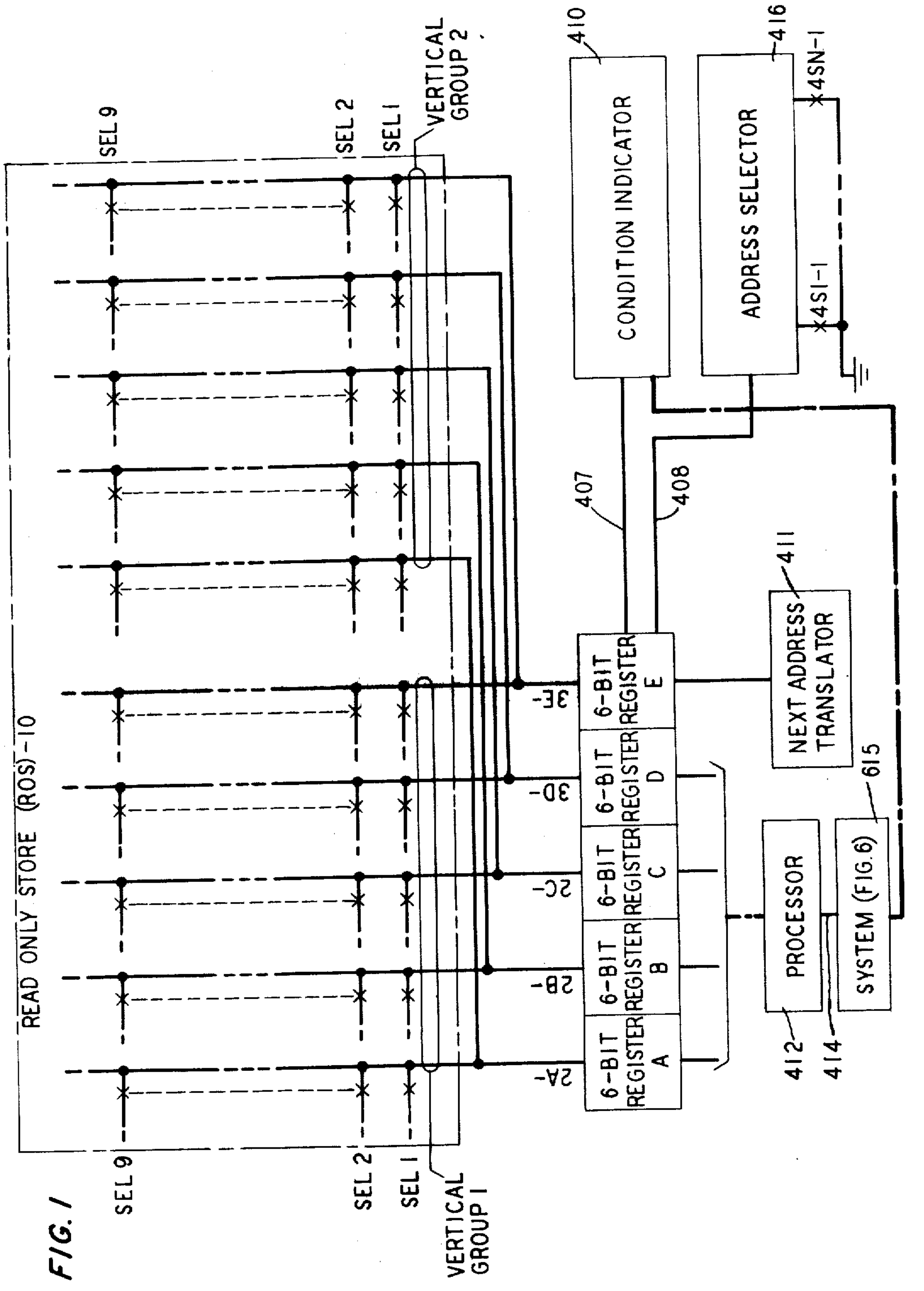
FIG. 1 is essentially a block diagram showing the interrelation of the exemplary embodiment of the invention.

Referring now to FIG. 1, the present invention is illustrated in a microprogrammed processor system controlled by data obtained in binary format from wired logic contained at each crosspoint of a crossbar switch read-only-store (ROS) 10. Each program consists of a series of 30-bit words (subroutines) addressable by 6 bits of the previously obtained word. The remaining 24 bits of each word are utilized for control of the processor system. Each vertical of the crossbar switch ROS 10, such as vertical 2A, consists of six leads which are multiplied to individual contacts of all horizontal levels SEL1—SEL9 of the switch in the manner to be more fully detailed hereinafter. In the illustrative example, five verticals are grouped together such that upon closure of the crossbar switch contacts on any level and selection of one of the vertical groups, such as vertical group 1, 30 information bits in binary format are available to registers A through E, with 6 bits being available on each of the verticals 2A, 2B, 2C, 3D, and 3E.

To start a desired program the address selector 416, in the manner to be more fully detailed hereinafter, transfers to register E the address location of the first word in the selected program. This information is then transferred to translator 411 which thereupon enables the select magnet and the group of hold magnets of ROS 10 associated with the desired microinstruction memory address. Accordingly, the first word of the selected microprogram is transferred from the ROS 10 memory to registers A through E. The 24 bits of information contained in registers A–D are used to control the processor 412, which in turn controls system 615, while the 6 information bits in register E are used to enable the next subroutine in the microprogrammed logic sequence.

One information bit of 6-bit register E is used as an interrogation control for situations in which it is necessary to verify external conditions before proceeding with the logic instructions. For example, when it is desired to perform a certain operation with a particular equipment unit, it may happen that the selected equipment unit is busy. Under these circumstances condition indicator 410, in the manner to be more fully detailed hereinafter, enables a change in the address portion of the data bits contained in register E. Accordingly, when the original program sequence cannot be continued, the microprogram is automatically changed in accordance with externally available information.

DETAILED DESCRIPTION

The following text will describe the embodiment of the invention in detail with reference to FIGS. 2, 3, 4, and 6. In order to facilitate a clear understanding of the invention, a simple electromechanical system 615 has been set forth in FIG. 6 together with a chart 601 of a microprogram arranged to control the system. The interrelation between the memory, the processor, and the electromechanical system will become more apparent from the following detailed discussion which is essentially a step-by-step operational analysis of the program shown on chart 601. However, it should be noted that this program was selected arbitrarily for illustrative purposes only, and in fact any number of other programs or systems may be utilized with the present invention.

Figure 6:
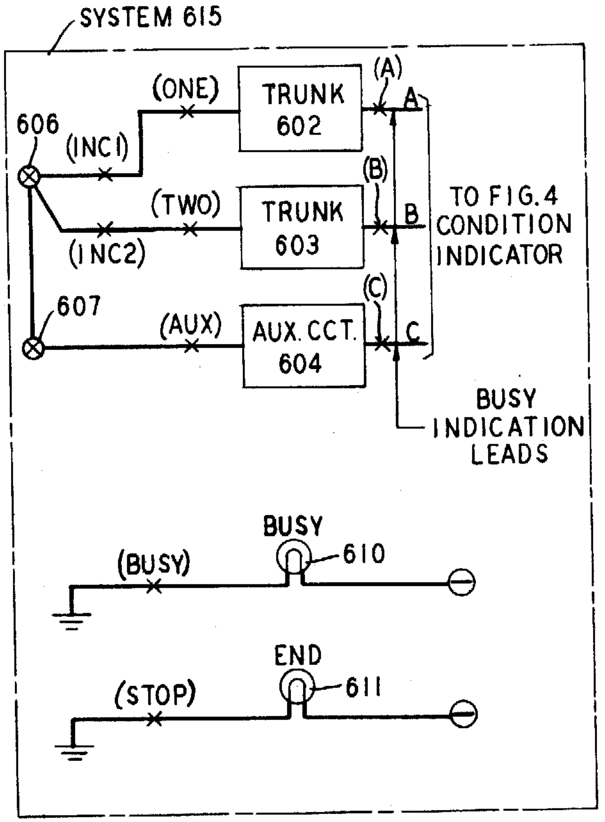
FIG. 6 shows a simple electromechanical telephone system together with a chart of a microprogram for controlling the system.

Turning now to FIG. 6, let us assume that a series of microprogram instructions are available for interconnecting trunk 602 with punching 606. We shall assume further that the microprogram contains a provision for connecting trunk 603 to punching 606 in the event that trunk 602 is busy. The microprogram is further arranged to enable the busy lamp 610 when both trunks are busy and to enable the end lamp 611 upon completion of the program.

CONNECTION OF TRUNK 602 TO PUNCHING 606

Figures 4, 5:
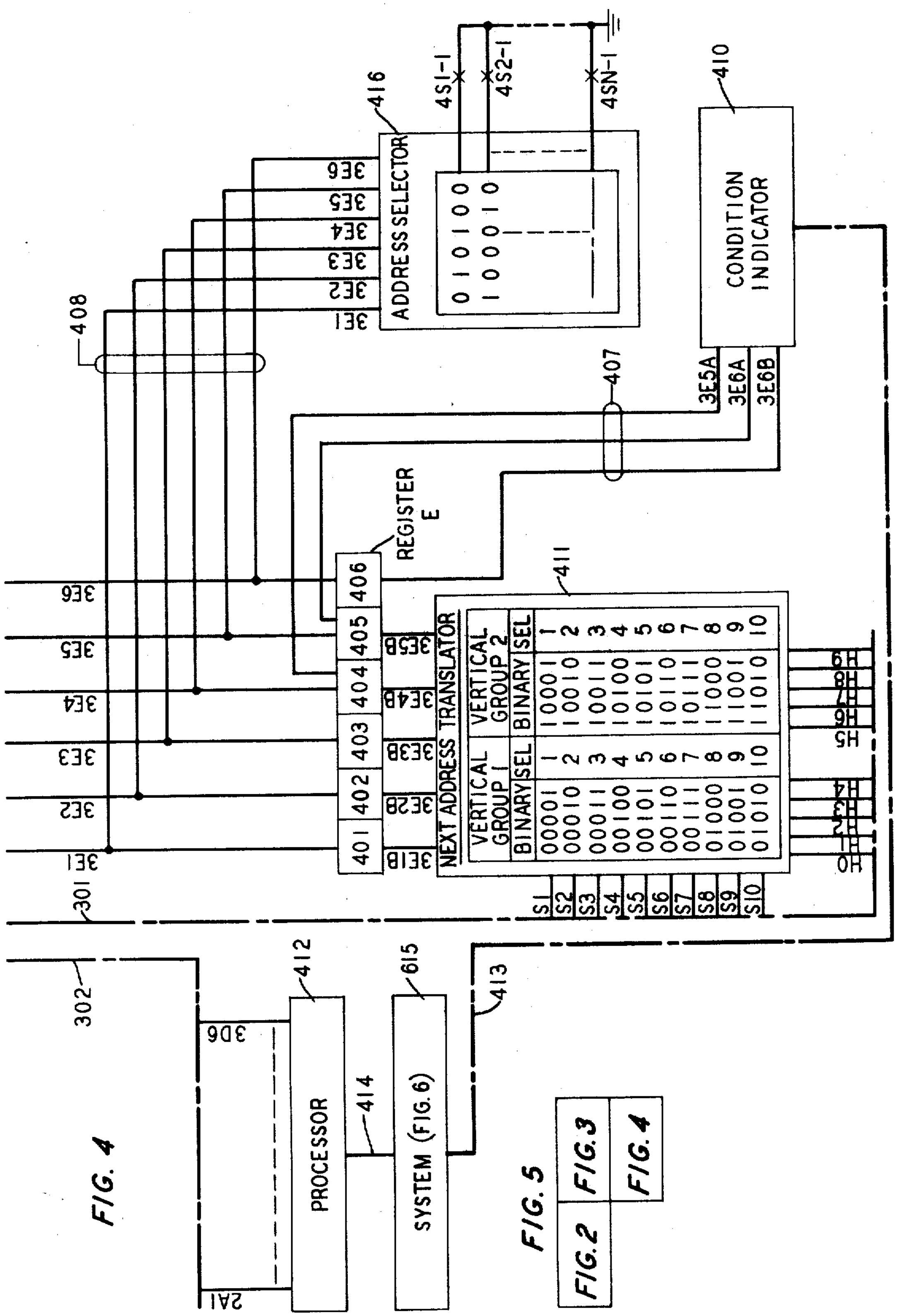
FIG. 5 shows the manner in which the other FIGS. should be arranged.

Turning now to FIG. 4, the enabling of contact 4S1-1, either by manual key or by remote relay operation, provides a ground to address selector 416 which may be any one of the circuit configurations well known in the art, operable upon the application of ground at one of several inputs to provide a 6-bit binary word at the output which word is exclusively associated with the selected input. Accordingly, the six bits of the selected word, which in this case are 010100 are transferred via cable 408 to individual subregisters 401—406 of register E which may be any one of the circuit configurations well known in the art having subregisters, such as flip-flop circuits, which are operable to receive binary data and to make that data available at the output until the input information is changed or until the subregisters are reset.

As set forth above, the digital data transferred to 401–consists of 5-bit binary word 010100 with each bit stored in a separate one of the subregisters 401—406. The 5-bit digital information contained in subregisters 401, 402, 403, 404, and 405 is provided to address translator 411 which may be any one of the circuit configurations well known in the art operable to receive a 5-bit binary word at the input and to thereupon apply operating grounds to one of two groups of crossbar switch hold magnet leads, the selected group being dependent upon the binary condition of the information bit contained in subregister 401 and to apply operating ground to one of 10 select magnet leads, the grounded lead being dependent upon the base 10 equivalent of the binary information bits contained in subregisters 402—405. Accordingly, since the four-bit word contained in subregisters 402—405 is 1010,a ground is provided on lead S10 which ground is extended via cable 301 to FIG. 2 for the operation of select magnet 2SEL 10 of crossbar switch memory ROS 10. Since a "0" is contained in subregister 401, translator 411 provides enabling grounds on each of the leads HO to H4 of vertical group 1, which grounds are extended via cable 301 to FIGS. 2 and 3 for the operation of ROS 10 hold 2HLDO), 2HLD1, 2HLD2, 3HLD3, and 3HLD4 of ROS 10.

Figure 3:
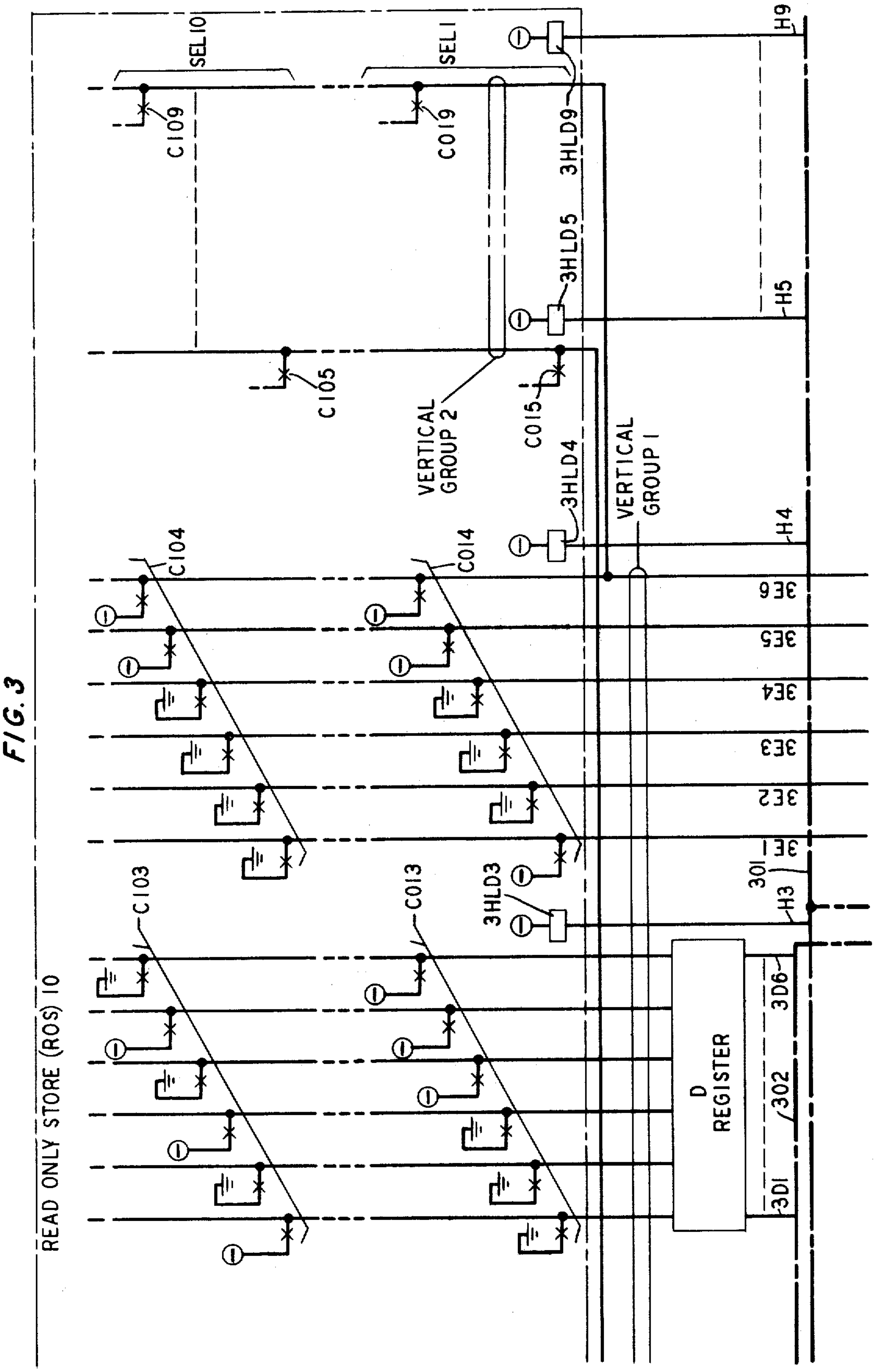

As shown in FIGS. 2 and 3, each contact of the ROS 10 has either a battery potential or a ground potential associated therewith. The battery represents a "1" in binary format while the ground signifies a binary "0. " While only two discrete voltage levels have been shown in the embodiment any number of different voltage levels may be utilized consistent only with the type of decoding circuitry employed for translation purposes.

It will be noted that on each level, such as level SEL 10, of the crossbar switch ROS 10 each vertical multiple is individually associated with six contacts. Accordingly, since in the embodiment a group of five hold magnets are operated whenever a select magnet is operated, 30 contacts are closed providing 30 bits of information in binary format for system control. It should be noted also that any number of bits may be chosen to represent a microinstruction by varying the number of hold magnets which are operated simultaneously, thereby effectively changing the memory capacity of the ROS 10 without necessitating the addition of other mechanical switches.

Operation of ROS 10 hold magnets 2HLDO–3HLD4 enables the closure of the crosspoint contacts C100—C104 which are associated with vertical group 1, SEL 10 (VG1, S1o) making the battery and ground potentials wired thereon individually available to registers A through E via the vertical multiples. Registers A through D are arranged in the manner previously discussed for register E such that the information obtained in binary format at the inputs of any register is maintained at the output until reset or changed. Accordingly register A now contains the binary word 101010 representing battery, ground, battery, ground, battery, ground from the six contacts respectively of crosspoint C100. In similar manner, registers B, C, D, and E now contain the binary information obtained from the enabled crosspoints C101, C102, C103, and C104, respectively, of ROS 10.

The outputs of registers A through D are made available via cable 302 to the input of processor 412, FIG. 4, which processor may be any one of the well-known systems operable to receive digital data in binary coded format over a plurality of input leads and to translate the received data into system commands for operational control purposes.

Upon receipt of the microprogram instruction contained in ROS 10 at the address locations associated with vertical group 1 and SEL 10 (VG1, S10), the processor 412 responds, as shown on chart 601, FIG. 6, by operating the (INC1) relay of system 615 (winding not shown). The processor 412 also enables the (A) and (B) relays of system 615 (windings not shown) thereby enabling the extension of condition indicator leads A and B from trunks 602 and 603 of system 615 to the condition indicator 410, FIG. 4. The purpose for the extension of these leads will become more apparent from that which is contained hereinafter.

Concurrent with the transfer of information from registers A through D to the processor 412, the binary word represented in ROS 10, FIG. 3, by the battery and ground potentials of the last six contacts C104 of the selected microinstruction is transferred via vertical multiples 3E1 through 3E6 to register E, FIG. 4 Accordingly, in the manner set forth previously, the binary information now contained in register E is 000011.

Turning now to FIG. 4, the "1" which is now contained in subregister 406 enables condition indicator 410, which may be any one of the circuit configurations well known in the art operable upon receipt of a binary "1" at the input to interrogate certain busy indicator leads and to provide voltage potentials on certain output leads sufficient to change the binary bits contained in subregisters connected therewith in accordance with the operational status of the interrogated equipments. The leads which are checked in this manner by condition indicator 410 are those which have been enabled by processor 412 in the manner previously discussed.

Assuming, as set forth before that trunk 602 is idle, condition indicator 410 allows the address bits of the word contained in register E to remain unchanged. Upon completion of the interrogation function, the 5-bit address which is 00001, is communicated to translator 411, thereby enabling the next address select and hold magnets of ROS 10 in the manner previously described. Accordingly, memory ROS 10 is enabled such that the information contained at the crosspoints of the group of hold magnets of vertical group 1 and select magnet 2SEL 1 is transferred to registers A through E replacing the digital information previously contained therein. The microinstruction now in registers A through D is communicated to processor 412 via cable 302, and in the manner previously discussed and as shown in chart 601, FIG. 6, is translated thereby so as to enable the (one) relay in system 615, FIG. 6, (winding not shown). Concurrently therewith processor 412 extends the busy indicator leads of the auxiliary circuit 604 to condition indicator 410 in the manner previously discussed.

Summarizing briefly at this point, the address location of the first word in the selected microprogram logic sequence is transferred to register E from address selector 416. Address translator 411 thereupon enables the proper select and hold magnets of wired logic memory ROS 10 such that the binary coded microinstruction contained as a series of battery and ground potentials at the crosspoints of the memory at the selected location is available to registers A through E. The 24bits contained in registers A through D are provided to processor 412 and translated into system commands for operating the (INC1) relay of system 615. One bit of the 6-bit word contained in register E is utilized to interrogate condition indicator 410 so as to determine the operational status of the system 615 trunks 602 and 603. Upon determining that trunk 602 is available, the program continues uninterrupted such that at the next address location the data transmitted to processor 412 enables the operation of the (one) relay of system 415 thereby connecting trunk 602 to punching 606.

CONNECTION OF AUXILIARY CIRCUIT 604 TO PUNCHING 607

Turning again to the chart 601 FIG. 6, it will be seen that the address word associated with the microprogram step last executed (vertical group 1, SEL 1) is 100011. Accordingly, in the manner set forth previously, the individual bits of this word are transferred to subregisters 401—406 of register E, FIG. 4. The "1" 38in subregister 406 enables the condition indicator 410, in the manner described previously, so as to interrogate the busy indicator leads of auxiliary circuit 604 which, it will be recalled, have been extended to the condition indicator 410 from system 615 by processor 412. Assuming that the auxiliary circuit 604 is idle at this time, condition indicator 410 again does not change the 5-bit address contained in subregisters 401—405 which address is 10001.

Translator 411 thereupon enables select magnet 2SEL 1 of ROS 10 together with the group of hold magnets of vertical group 2. The microprogram information contained on the now closed crosspoints is transferred to registers A through E in the same manner as set forth previously for information from vertical group 1 which information is made available to processor 412 via cable 302.

Reference to chart 601 FIG. 6 shows that the processor translates the received information from VG2, SEL 1 into system commands for the operation of the (AUX) relay of system 615 (winding not shown) thereby connecting the auxiliary circuit to punching 607. The address portion of the received microinstruction, which is word 100100, is placed in subregisters 401—406 of register E, FIG. 4, in the manner set forth previously. The "0" in subregister 406 signifies that the enabling of condition indicator 410 is not necessary at this time. Accordingly, the 5-bit address word contained in subregisters 401—405, which word is 10010, is provided to translator 411 thereby enabling the operation of the crosspoints associated with SEL 2 and vertical group 2.

The information contained on the now enabled crosspoint contacts is provided to processor 412 and translated thereby as shown in chart 601, FIG. 6, to operate the (STOP) relay of system 615 (winding not shown). The end lamp 611 is thereupon enabled in an obvious manner from ground through the enabled make contact of the (STOP) relay as a visual indication that the program is complete. The address portion of the instruction last executed (VG2, S2) is 000000, which word is now contained in subregisters 401—406, provides a nontranslatable code for translator 411 so as to stop the sequential microinstruction program at this point.

TRUNK 602, BUSY—TRUNK 602, IDLE

Turning again to FIG. 4, we shall now assume that trunk 602 together with (INC1) relay in system 615 are busy, and that contact 4S1–1 which controls the start of the program designed to connect trunk 602 or trunk 603 to punching 606, is enabled. In the manner set forth previously, the information contained at the ROS 10 crosspoint associated with SEL 10 vertical group 1 is transferred to processor 412 and translated thereby in accordance with chart 601, FIG. 6. Accordingly, processor 412 extends the busy indication leads of trunks 602 and 603 to condition indicator 410 in the manner set forth hereinbefore. Processor 412 is arranged to inhibit the operation of relay (INC2) at this time because of the previously operated status of the (INC1) relay so as to prevent a double connection from trunks 602 and 603 to punching 606.

As shown on chart 601, FIG. 6, the address information of the next microinstruction which is transferred from ROS 10, crosspoint C104 (VG1, S10) is, 000011. The "1" which is now contained in subregister 406 of register E enables the interrogation of the busy indication leads extended from system 615, FIG. 6, by condition indicator 410, as set forth previously. Accordingly, since lead A indicates a busy condition of trunk 602, while lead B indicates that trunk 603 is idle, the condition indicator 410 is arranged as set forth previously to change the data bit in subregister 405 from a "1" to a "0" and the data bit in subregister 404 from a "0" to a "1" such that the 5-bit address word in register E is now 00010. This address is provided to translator 411 so as to enable the crosspoints of SEL 2, vertical group 1 instead of the crosspoints of SEL 1, vertical group 2.

The logic instruction contained on the now operated crosspoints is transferred in the manner detailed above and as shown in chart 601, FIG. 6 to the processor 412 thereby enabling the operation of relay (two) and the extension of the auxiliary circuit 604 busy indicator leads to condition indicator 410. The address of the next instruction which is transferred at this time from ROS 10, FIG. 3 crosspoints C024 (not shown) is 100011. As set forth above, the "1" in subregister 406 again enables condition indicator 410, this time as a check on the condition of the auxiliary circuit 604 busy indicator leads. Assuming the auxiliary circuit 604 to be busy at this point, the condition indicator 410 changes the information bits in subregisters 404 and 405 from "0" and "1" to "1" and "0" respectively, such that the new 5-bit address word is 10010. Accordingly, the ROS 10 is interrogated at this address location (VG2, S2) and processor 412 is directed to enable the (STOP) relay in system 615 (winding not shown), and again zeros are provided to translator 411 as a logic sequencing stop code. The end lamp 611 is now illuminated as an indication that the microprogram has been completed.

ALL TRUNKS BUSY

Turning again to FIG. 4, we shall now assume that trunks 602 and 603 are both busy and that contact 4S1—1 which controls the start of the program designed to connect either trunk 602 or trunk 603 to punching 606, is enabled. In the manner set forth previously, the information contained at the ROS 10 crosspoint associated with vertical group 1 SEL 10 (VG1, S10) is provided to processor 412 and translated thereby in accordance with chart 601, FIG. 6. Accordingly, process 412 extends the busy indication leads of trunk 602 and 603 to condition indicator 410 in the manner set forth hereinbefore. As shown on chart 601, the address information of the next microinstruction is 000011.

The "1" which is now contained in subregister 406 of register E enables the interrogation by condition indicator 410, as set forth previously, of the busy indication leads extended from system 615, FIG. 6. Accordingly, since leads A and B associated with trunks 602 and 603 both indicate a busy condition on the respective trunks, the condition indicator 410 is arranged to change the data bit in subregister 404 from a "0" to a "1" such that the 5-bit address word in register E (subregisters 401—405) is now 00011. This address is provided to translator 411 so as to enable the crosspoints of vertical group 1, SEL 3 instead of the crosspoints of vertical group 2, SEL 1.

The logic instruction contained on the now operated crosspoints is transferred in the manner detailed above to the processor 412 thereby enabling, as shown on chart 601, (VG1, S3), the operation of the (BUSY) relay (winding not shown) of system 615. Again zeros are provided to translator 411 as a logic stop code. The busy lamp 610 is now illuminated as an indication that all trunks are busy and that the program has been completed.

INITIATION OF A PROGRAM TO CONNECT AUXILIARY CIRCUIT 604 TO PUNCHING 607

Since the micrologic program consists of a series of steps taken sequentially any step may become the starting point for a program. For example, let us assume that it is desired to connect auxiliary circuit 604, system 615, to punching 607 and that contact 4S2–1, FIG. 4, controls the start of this program. Accordingly, the address word associated with enabled make contact 4S1—1 in address selector 416 is enabled thereby transferring the word 100010 to register E in the manner previously discussed. The logic instruction contained at the crosspoints associated with select 1, vertical group 2, is transferred to processor 412 thereby enabling the operation of the (AUX) relay as shown by chart 601, FIG. 6. The next address associated therewith is 100100 which, in the manner previously described, interrogates the memory ROS 10 at vertical group 2, SEL 2, thereby enabling the operation of the (STOP) relay as shown on chart 601, FIG. 6, and providing zeros as a sequential stop code to the system.

CONCLUSION

While the equipment of this invention has been shown in a particular embodiment wherein a crossbar switch is arranged to provide microprogrammed instructions to an electronic processor system, it is understood that such an embodiment is intended only to be illustrative of the present invention and numerous other arrangements may be devised by those skilled in the art without departing from the spirit and scope of the invention.

For example, this invention could be used to provide memory capacity for storing telephone directory numbers in a conventional telephone switching system. In such a system each contact set of the mechanical read-only-store 10 would be arranged in coded fashion to represent a base 10 digit. A number of such contact sets would then be arranged into a vertical group corresponding to the directory number of a particular station. Each level of the memory would then represent one or more directory number depending upon the number of vertical groups utilized.

I claim:

1. In combination in a processor system controllable by word commands comprising a series of discrete voltage potentials, mechanical memory means including horizontal and vertical contact means defining a plurality of crosspoints, means for individually associating each of said crosspoints with one of said discrete voltage potentials, and means for closing the crosspoints defined by selected horizontal contacts and a group of selected vertical contacts so as to provide one of said word commands to said processor system.

2. The invention set forth in claim 1, wherein said horizontal contacts are enabled by select magnet means and wherein said selected group of vertical contacts is enabled by a plurality of hold magnet means, each of which hold magnets is itself associated with a plurality of vertical contacts.

3. The invention set forth in claim 1, wherein said discrete voltage potentials comprise battery and ground potentials representing binary values and said word commands consist of system control data and sequential address data, and wherein said processor system further comprises modification means for selectively changing the binary values of said address data of said word command.

4. The invention set forth in claim 3, further comprising equipment units controllable by said processor system, and wherein said system control data controls the interconnection of a plurality of said equipment units and said address data controls the interrogation of said mechanical memory means, means enabled by certain binary values in said system control data for extending busy indicator leads from certain of said equipment units to said modification means, and wherein said modification means further comprises means enabled by a certain binary value in said address data for interrogating said extended busy indicator leads.

5. In combination in a microprogrammed wired logic control arrangement, crossbar switch means including horizontal and vertical contact means defining a plurality of crosspoints, select magnet means associated with said horizontal contact means, and hold magnet means associated with said vertical contact means, means individually connecting each of said horizontal contact means to one of two discrete potentials to represent a single binary value stored at each crosspoint, means for connecting all said vertical contact means in a vertical column together to define individual outputs, means for selectively operating one of said select magnet means to enable the readout of the binary valued microinstruction stored at the crosspoints associated with said select magnet means, and means for operating a plurality of hold magnets simultaneously to cause closure of the number of said crosspoints equal to the length of the microinstruction to be read out.

6. The combination in accordance with claim 5, wherein each said hold magnet means itself is associated with a plurality of said crosspoints.

7. The combination in accordance with claim 5, further comprising data register means and address register means, means for connecting certain of said outputs to said data register means and other of said outputs to said address register means, decoder means connected to said data register means, and means connected to said address register means for modifying the binary values received therein from said outputs.

8. The invention set forth in claim 7, further comprising a plurality of equipment units, means controlled by the binary values contained in said data registers for interconnecting certain of said equipment units, a plurality of said crosspoints arranged into microinstructions, said microinstructions defining a plurality of sequentially arranged microprograms for controlling said wired logic arrangement, means enabled by certain binary values in said data registers for extending busy indicator leads from certain of said equipment units to said address register modifying means, said address register modifying means further comprising means enabled by a certain binary value in said address registers for enabling said modification of said binary values in accordance with the busy-idle status of said extended indicator leads, and translator means enabled by certain binary values contained in said address registers for controlling the readout of the next microinstruction in a selected microprogram.

9. The invention set forth in claim 8 further comprising address selector means containing a plurality of binary words for selectively enabling one of said microprograms, and means for enabling the transfer of any one of said words to said address translator so as to start the sequencing of one of said microprograms.

10. A memory device for providing data to a processor system comprising:

a crossbar switch having a plurality of horizontal contacts arranged in a plurality of rows and a plurality of vertical contacts arranged in a plurality of columns so as to form a plurality of crosspoints wherein each of said crosspoints consists of one of said horizontal contacts and one of said vertical contacts, means for associating each of said horizontal contacts with a discrete voltage potential representing a data bit, and means for arranging all of said vertical contacts in each of said columns as a vertical multiple such that upon contact closure of any of said crosspoints in said vertical multiple the voltage potential data on the associated horizontal contact will be transferred to said processor system via said vertical multiple.

11. The invention set forth in claim 10, wherein said memory device further comprises:

select means individually associated with each of said horizontal rows for selectively enabling any one of said rows, and hold means associated with a fixed number $n$ of said vertical multiples for selectively enabling said $n$ vertical multiples and wherein said processor system further comprises means for enabling one of said select means and a group of said hold means so as to enable a data transfer from said memory device to said processor of said data from at least $2n$ vertical multiples.

Disclaimer 3,579,198.—*John A. Giunta*, Long Branch, N.J. MICROPROGRAMMED WIRE LOGIC MEMORY. Patent dated May 18, 1971. Disclaimer filed Dec. 6, 1971, by the assignee, *Bell Telephone Laboratories, Incorporated.*

Hereby enters this disclaimer to claim 10 of said patent.

[*Official Gazette March 7, 1972.*]